US006094551A

United States Patent [19]

Nakamura et al.

[11] Patent Number: 6,094,551

[45] Date of Patent: Jul. 25, 2000

[54] MULTICOLOR IMAGE FORMATION APPARATUS AND MULTICOLOR IMAGE FORMATION METHOD FOR CONTROLLING TIMING FOR FORMING A COLOR TONER IMAGE ON A PHOTOCONDUCTOR

[75] Inventors: Mitsuhide Nakamura; MasahiKo Hozumi, both of Minami Ashigara, Japan

[73] Assignee: Fuji Xerox Co., Ltd., Tokyo, Japan

[21] Appl. No.: 09/303,668

[22] Filed: May 3, 1999

[30] Foreign Application Priority Data

Jun. 19, 1998 [JP] Japan .................................. 10-173470

[51] Int. Cl.[7] .......................... G03G 15/00; G03G 15/01; G01D 15/06

[52] U.S. Cl. .......................... 399/160; 347/115; 399/178; 399/301; 399/302

[58] Field of Search .................................... 399/302, 301, 399/308, 229, 298, 231, 297, 178, 160; 347/172, 115, 232

[56] References Cited

U.S. PATENT DOCUMENTS

| | | | |
|---|---|---|---|
| 4,540,272 | 9/1985 | Abe et al. | 399/231 |
| 4,899,196 | 2/1990 | Mahoney | 399/302 |
| 4,972,231 | 11/1990 | Bares | 399/229 |
| 5,287,160 | 2/1994 | Dastin et al. | 399/301 |
| 5,790,930 | 8/1999 | Fuchiwaki | 399/302 |

FOREIGN PATENT DOCUMENTS

| | | |
|---|---|---|
| 59-17416 | 4/1984 | Japan . |
| 62-115475 | 5/1987 | Japan . |
| 4-119372 | 4/1992 | Japan . |
| 4-276774 | 10/1992 | Japan . |
| 6-35290 | 2/1994 | Japan . |
| 7-325455 | 12/1995 | Japan . |

*Primary Examiner*—Susan S. Y. Lee
*Attorney, Agent, or Firm*—Oliff & Berridge, PLC

[57] ABSTRACT

In the formation of a multicolor image for generating a color print by repeating operation for transferring on an intermediate transfer member every color after one color toner image is formed on a photoreceptor drum, when an image of each color is written on the photoconductor, the image writing start position of each color is differentiated in a process direction of the photoconductor on the basis of a position reference mark on the intermediate transfer member detected by a sensor. This prevents a defect on the photoconductor from being enlarged and visually conspicuous.

14 Claims, 4 Drawing Sheets

○: ACTUALLY SIZE OF 100 μm

○: ACTUALLY SIZE OF 200 TO 300 μm

MULTICOLOR IMAGE FORMATION APPARATUS AND MULTICOLOR IMAGE FORMATION METHOD FOR CONTROLLING TIMING FOR FORMING A COLOR TONER IMAGE ON A PHOTOCONDUCTOR

BACKGROUND OF THE INVENTION

The present invention relates to technique for arranging a developing machine housing toner in plural different colors opposite to a photoconductor, repeating operation for transferring on paper and an intermediate transfer member every color after one color toner image is formed on the photoconductor and generating a color print by transferring color toner images in all colors in a multicolor image formation apparatus such as a color printer, particularly relates to a multicolor image formation apparatus and a multicolor image formation method for controlling timing for forming a color toner image on the photoconductor.

An image formation apparatus such as a color printer and a color copying machine is generally constituted by means for overlapping and transferring color toner images in plural colors on paper and means for fixing the paper on which the color toner images are overlapped using a fixing device and generating a color print.

For example, as an image formation apparatus disclosed in the Examined Japanese Patent Application Publication No. Sho 59-17416, an apparatus in which a rotating drum holding one photoconductor, plural developing machines and a transfer member for holding a transferred medium are combined is also often used. In such an image formation apparatus, an electrostatic latent image is transferred by rotating the transfer member once after the electrostatic latent image in a first color is formed on the photoconductor by substantially equalizing the diameters of the transfer member and the rotating drum and rotating them synchronously, operation for developing the transferred electrostatic latent image is repeated every color and an image is formed, preventing the misregistration of color.

In the Unexamined Japanese Patent Application Publication Nos. Hei 4-119372, Hei 7-325455 and others, an image formation apparatus wherein a belt photoconductor and a belt intermediate transfer member are arranged with them combined, operation for transferring a color toner image on the intermediate transfer member is repeated every color after one color toner image is formed on the belt photoconductor, all color toner images are transferred on paper and sent to a fixing device after all the color toner images are transferred on the intermediate transfer member with the color toner images overlapped is proposed. In such an image formation apparatus for generating a color toner image using the belt photoconductor, to prevent the misregistration of color from occurring when images in each color are transferred on the intermediate transfer member with them overlapped, a reference mark is set on the intermediate transfer member. Every time the intermediate transfer member is turned, the reference mark provided to the intermediate transfer member is detected and timing for writing the next image is set using the detection signal.

According to the above image formation method disclosed in the Examined Japanese Patent Application Publication No. Sho 59-17416, the large misregistration of color is not caused basically, however, the misregistration of a few tens μm is caused every color because of the precision of a gear and others. Even if each color image is off by approximately a few tens μm, no visual sense of incompatibility is caused as the whole image. However, there is a problem that if an inevitable defect of approximately 100 μm caused in the manufacturing process of a photoconductor exists on the photoconductor, the original defect of approximately 100 μm lines with it off, is printed as a defect of 200 to 300 μm and visually becomes very remarkable.

In the above image formation method disclosed in the Unexamined Japanese Patent Application Publication Nos. Hei 4-119372 and No. Hei 7-325455, a reference mark is set on an intermediate transfer belt, the reference mark provided to the intermediate transfer belt is detected every time the intermediate transfer belt is turned and timing for writing the next image is set using the detection signal. Therefore, according to this method, a visual sense of incompatibility caused by the misregistration of color is also not caused as the whole image. However, if an inevitable defect of approximately 100 μm caused in the manufacturing process of a photoconductor on the photoconductor exists, the defect is transferred with it off by a few mm every color, the defect of approximately 100 μm appears every few mm in a normal color image and becomes very remarkable visually.

The reason why a defect appears and is remarkable visually is as follows: The peripheral length of a photoconductor and the peripheral length of an intermediate transfer member are set so that they are equal or either peripheral length is integral times as long as the other peripheral length to prevent the misregistration of color and simplify control. However, the intermediate transfer member is in the shape of a belt, the peripheral length cannot be fixed under low temperature and high temperature, it is also difficult to manufacture the belt without an error and an error of approximately a few mm for desired length cannot be actually avoided. Therefore, as disclosed in the Unexamined Japanese Patent Application Publication Nos. Hei 4-119372 and Hei 7-325455, an intermediate transfer member is timed to prevent the misregistration of color. As a result, the generation start position of an image on a photoconductor is off by a few mm and a defect on the photoconductor lines with it off.

Also, as disclosed in the Unexamined Japanese Patent Application Publication No. Hei 7-325455, an electrification characteristic and a toner image formation characteristic are generally not fixed, slight dispersion exists on the surface of a photoconductor and there is a problem that a position in which a toner image in each color is generated cannot be arbitrarily set when a full color print is generated. It is described in the above patent application that if a color print is generated, a position for writing an image in each color is required to be set to a fixed position on a photoconductor. As a result, a defect on the photoconductor is transferred with it off by a few mm.

SUMMARY OF THE INVENTION

The object of the present invention is to provide a multicolor image formation apparatus and a multicolor image formation method wherein an inevitable defect in manufacturing a photoconductor can be prevented from being enlarged and can be visually inconspicuous.

The present invention is characterized in that when an image in each color is written to a photoconductor, the image writing start position of each color is differentiated in the process direction of the photoconductor in the formation of a multicolor image in which a color print is generated by repeating transfer operation every color after one color toner image is formed on the photoconductor. The process direction of the photoconductor means a direction perpendicular to the width of the photoconductor and is equivalent to the rotational direction of the photoconductor.

DETAILED DESCRIPTION OF THE PREFERRED EMBODIMENTS

Figure 1:
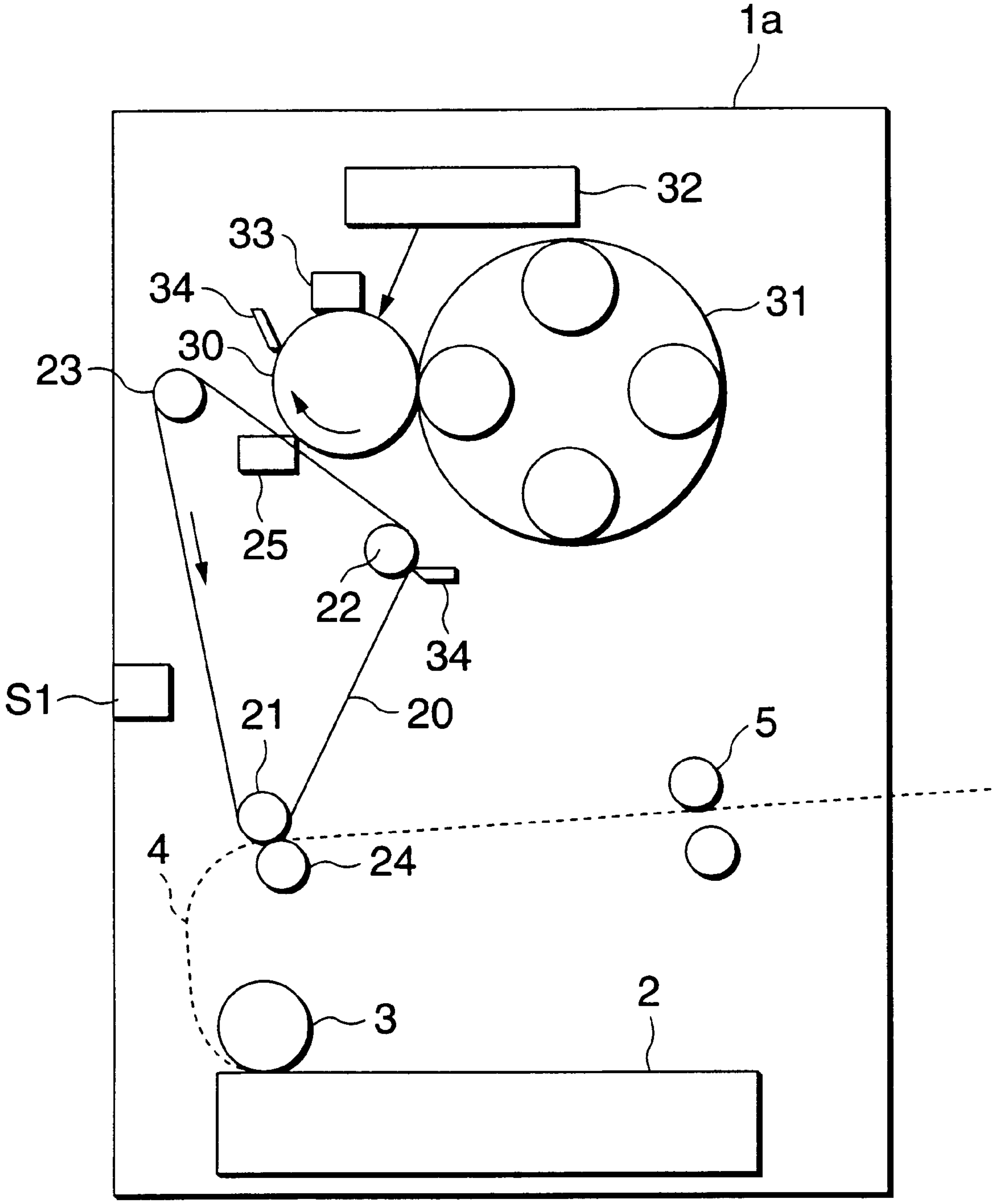
FIG. 1 is an explanatory drawing showing an embodiment of a multicolor image formation apparatus according to the present invention.

In the present invention, it is desirable that a position in which the writing of an image in each color to a photoconductor is started is distant by 5 mm or more in the process direction of the photoconductor. To differentiate writing start positions, for example, for a first color, a photoconductor and an intermediate transfer member are synchronized, are rotated at the same peripheral speed and are exposed, and when an image in each color of a second color and the following colors is exposed, a gear engaging the photoconductor and the intermediate transfer member is disengaged and only the photoconductor is rotated in a process direction with the intermediate transfer member stopped.

Difference (Distance) between the writing start positions of images in each color shall meet the following expression in the process direction of the photoconductor.

$$d = L1/n$$

(d: difference (distance) between the writing start positions of images in each color), L1: peripheral length of photoconductor, n: number of developing machines for different colors)

According to the present invention, the object of the present invention can be realized by setting the peripheral length of a photoconductor and the peripheral length of an intermediate transfer member so that they do not have the relationship of integral times. Therefore, a photoconductor and an intermediate transfer member according to the present invention can be constituted so that relationship between the peripheral length L1 of the photoconductor and the peripheral length L2 of the intermediate transfer member meets the following expression.

$$L2 \neq N \cdot L1$$

(N: integer)

Also, a photoconductor and an intermediate transfer member may be also constituted so that relationship between the peripheral length L1 of the photoconductor and the peripheral length L2 of the intermediate transfer member meets the following expression.

$$L2 = N \cdot L1 + (2M+1)/n \cdot L1$$

(N, M: integer, n: number of developing machines different in color)

As a result of examining the cause of the dispersion of a photoconductor disclosed in the Unexamined Japanese Patent Application Publication No. Hei 7-325455, it is found out that the dispersion is caused by the full deflection of a photoconductor. According to JIS B0021, the above full deflection means difference between the maximum difference larger than the radius and the maximum difference smaller than the radius out of differences between distance from the surface of a photoreceptor drum to the central axis and the radius. Dispersion occurs because distance between a photoconductor and a developing machine is varied due to the full deflection of the photoconductor and hereby, the density of a toner image formed on the photoconductor varies when the photoconductor develops the toner image. Therefore, to keep balance among each color in case an image is formed from a position different from the process direction of a photoconductor, the full deflection of a photoconductor is required to be 100 μm or less. A method of keeping the full deflection of a photoconductor 100 μm or less is not limited, however, for example, the full deflection of a photoconductor can be kept 100 μm or less by the combination of base material for the photoconductor and a flange in the manufacturing method of a photoconductor disclosed in the Unexamined Japanese Patent Applciation Publication No. Hei 9-185491.

To prevent the misregistration of images, an image may be also formed on a photoconductor according to a reference signal sent to any place of an intermediate transfer member.

As for a photoconductor according to the present invention, a layer under coating is formed on a conductive base substance if necessary and a photosensitive layer is formed on the above layer. For a photosensitive layer, any well-known one such as a photosensitive layer consisting of a single layer and a photosensitive layer in which a charge generating layer and a charge carrying layer are laminated may be adopted. For the photosensitive layer which is a lamination, a laminated photosensitive layer on the surface of which a charge carrying layer is put is excellent at stability in repetition and performance such as resistance to environmental variation. Further, if necessary, a protective layer may be also provided on the surface. Well-known material may be used for each layer of the above photoconductor and for example, material disclosed in the Unexamined Japanese Patent Application Publication No. Hei 8-314172 may be used. For a method of forming the above photosensitive layer, a coating method such as a dip coating method, a spray coating method, a bead coating method, a blade coating method and a roller coating method can be used. If a humidifying method is not used, it is desirable that drying by heating is executed after drying at room temperature. It is desirable that drying by heating is executed at the temperature of 30 to 200° C. for five minutes to 2 hours.

First Embodiment

FIG. 1 is an explanatory drawing showing an embodiment of a multicolor image formation apparatus according to the present invention, a multicolor image formation apparatus 1*a* is provided with a photoreceptor drum 30 the full deflection of which is 95 μm to transfer an image on an intermediate transfer belt 20 and a developing system 31, a writing device 32, an electrifying collotron 33, a cleaning device 34 and others are arranged opposite to the photoreceptor drum 30. In the developing system 31 arranged opposite to the photoreceptor drum 30, developing machines of four colors, black (K), yellow (Y), magenta (M) and cyan (C) are arranged and one of the developing machines of four colors is moved to a position corresponding to the photoreceptor drum 30 so as to supply toner to an electrostatic latent image formed on the photoreceptor drum 30 and generate a color toner image.

Also, in the image formation apparatus 1*a*, means for carrying paper from a paper feed tray 2 arranged in a lower part via a paper carrying route 4 using a paper feed roller 3 is provided. Paper on which an image is transferred by a transfer roller 24 arranged opposite to the intermediate transfer belt 20 is fixed via a fixing device 5 and the paper completed as a print is ejected.

In the above structure, the similar process system to a general image formation apparatus using electrophotography is arranged opposite to the photoreceptor drum 30, after uniform electrification is applied by the electrifying collotron 33, an electrostatic latent image is formed by exposing using a laser beam from the writing device 32, toner is supplied to the electrostatic latent image from any developing machine in the developing system 31 and a color toner image is formed. The color toner image formed on the photoreceptor drum 30 is transferred on the intermediate transfer belt 20 by discharge by a transfer collotron 25.

In a state in which plural color toner images are transferred on the intermediate transfer belt 20 with them overlapped, paper is fed from the paper feed tray 2 in synchronization with the position of the color toner images and the toner images are transferred on the paper by the discharge of the transfer roller 24.

A roller member provided with arbitrary electrification characteristic may be used for the transfer roller 24 and only when a toner image is transferred from the intermediate transfer belt 20 onto paper, the transfer roller presses the intermediate transfer belt 20. In the meantime, when a color toner image is transferred from the photoreceptor drum 30 onto the intermediate transfer belt 20, the transfer roller 24 is held with it not touched to the intermediate transfer belt 20.

In this embodiment, paper is strongly pressed upon the intermediate transfer belt 20 by the transfer roller 24 so that the transfer state of an image can be kept satisfactory. When the transfer roller 24 is pressed in the position of a roller 21 for guiding the intermediate transfer belt 20, a toner image can be satisfactorily shifted from the intermediate transfer belt 20 onto paper.

A transfer collotron may be also provided in place of the above transfer roller 24, however, the type of the above transfer means can be selected depending upon the characteristics of an image formation apparatus and an apparatus with arbitrary constitution may be used so that the best effect upon the transfer of an image can be produced.

In the image formation apparatus 1*a* equivalent to this embodiment, a photoreceptor drum with the diameter of 84 mm is used for the photoreceptor drum 30, an intermediate transfer belt with the peripheral length of 593.5 mm (in case N=2 and M=0 are substituted in an expression in aspect 7) is used for the intermediate transfer belt 20, and the photoreceptor drum 30 and the intermediate transfer belt 20 are rotated at the same peripheral speed with them synchronous.

Figure 3:
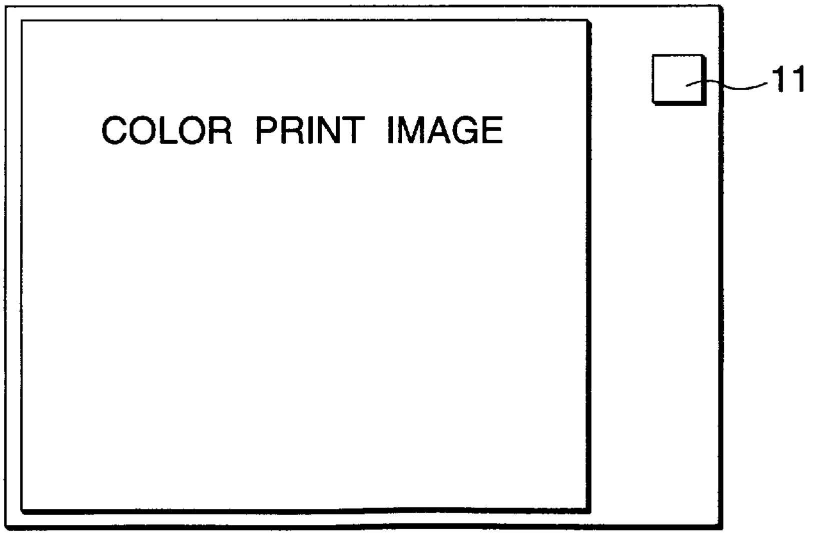
FIG. 3 is a schematic drawing showing a reference mark on an intermediate transfer member.

FIG. 3 is a schematic drawing showing a reference mark on the intermediate transfer belt and in the image formation apparatus according to the present invention, as a reference mark 11 formed on the photoconductor 30 as shown in FIG. 3, reference information for the transfer of images on the intermediate transfer belt 20 is set by forming the reference mark by black toner in case a first color toner image is black for example and transferring the reference mark onto the intermediate transfer belt. Therefore, a position in which a second color toner image is to be formed on the photoconductor can be controlled using the reference mark transferred on the intermediate transfer belt with a sensor S1.

In this embodiment, the above reference mark 11 is used, however, a reference mark may be also provided by notching a part of the intermediate transfer belt and applying a mark for reflection on the intermediate transfer belt.

If means for controlling writing a second color image is provided by transferring the above reference mark on the intermediate transfer belt, images of a second color and the following colors are further formed on the photoconductor according to the present invention using the reference mark on the intermediate transfer belt and a signal for writing an image on the photoconductor is output according to a reference signal as the reference mark provided to the intermediate transfer belt. Therefore, when color toner images formed on the photoconductor are transferred on the intermediate transfer belt with the images overlapped, the position of the images can be prevented from being off.

Figure 4:
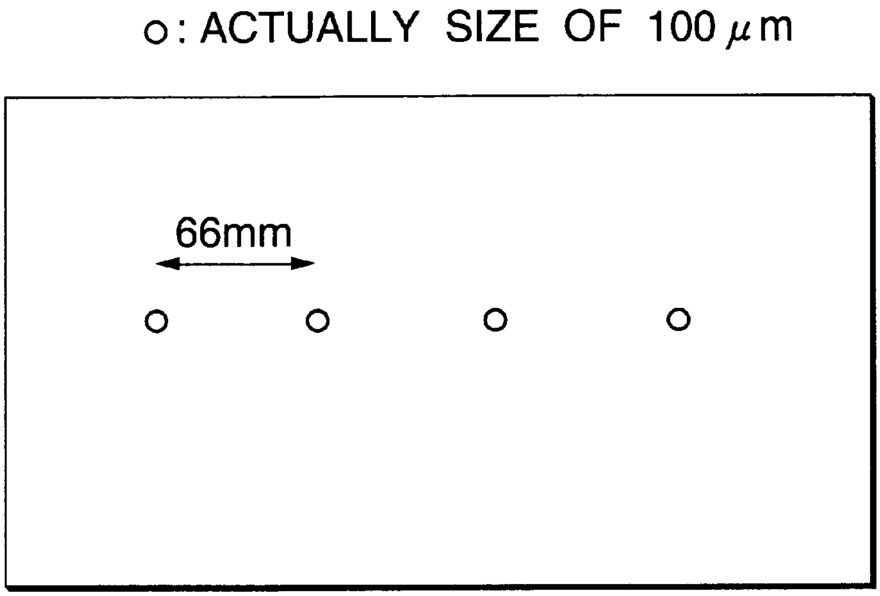
FIG. 4 is a schematic drawing showing a color print sample acquired in a first embodiment.

FIG. 4 is a schematic drawing the contents of which are omitted and which shows only a defect of approximately 100 μm of a color print sample acquired by the first embodiment and even if a defect of approximately 100 μm exists on the photoconductor, it is substantially difficult to find the above defect unless a magnifying glass is used though in a print produced according to this embodiment, the defect of approximately 100 μm forms a line at an interval of approximately 66 mm in the order of black, yellow, magenta and cyan. Dispersion such as irregular color is not also seen at all.

(First example for comparison)

A color print is produced as in the first embodiment except that a photoconductor the full deflection of which is 110 μm is used and an intermediate transfer belt 20 with the peripheral length of 528 mm is used.

Figure 5:
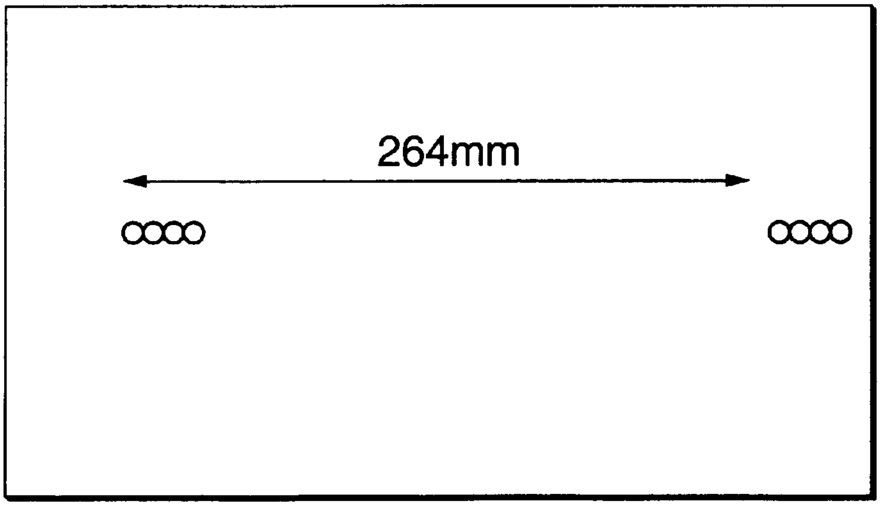
FIG. 5 is a schematic drawing showing a color print sample acquired in a first example for comparison.

FIG. 5 is a schematic drawing the contents of which are omitted and which shows only a defect of approximately 100 μm of a color print sample acquired in the first example for comparison, if a defect of approximately 100 μm exists on the photoconductor, four defects of approximately 100 μm are caused at the interval of 0.5 mm, as a result, black, yellow, magenta and cyan four points exist in line in 1.5 mm at the interval of 264 mm, they are visually outstanding and terrible. Slight dispersion such as irregular color is felt.

Second Embodiment

Figure 2:
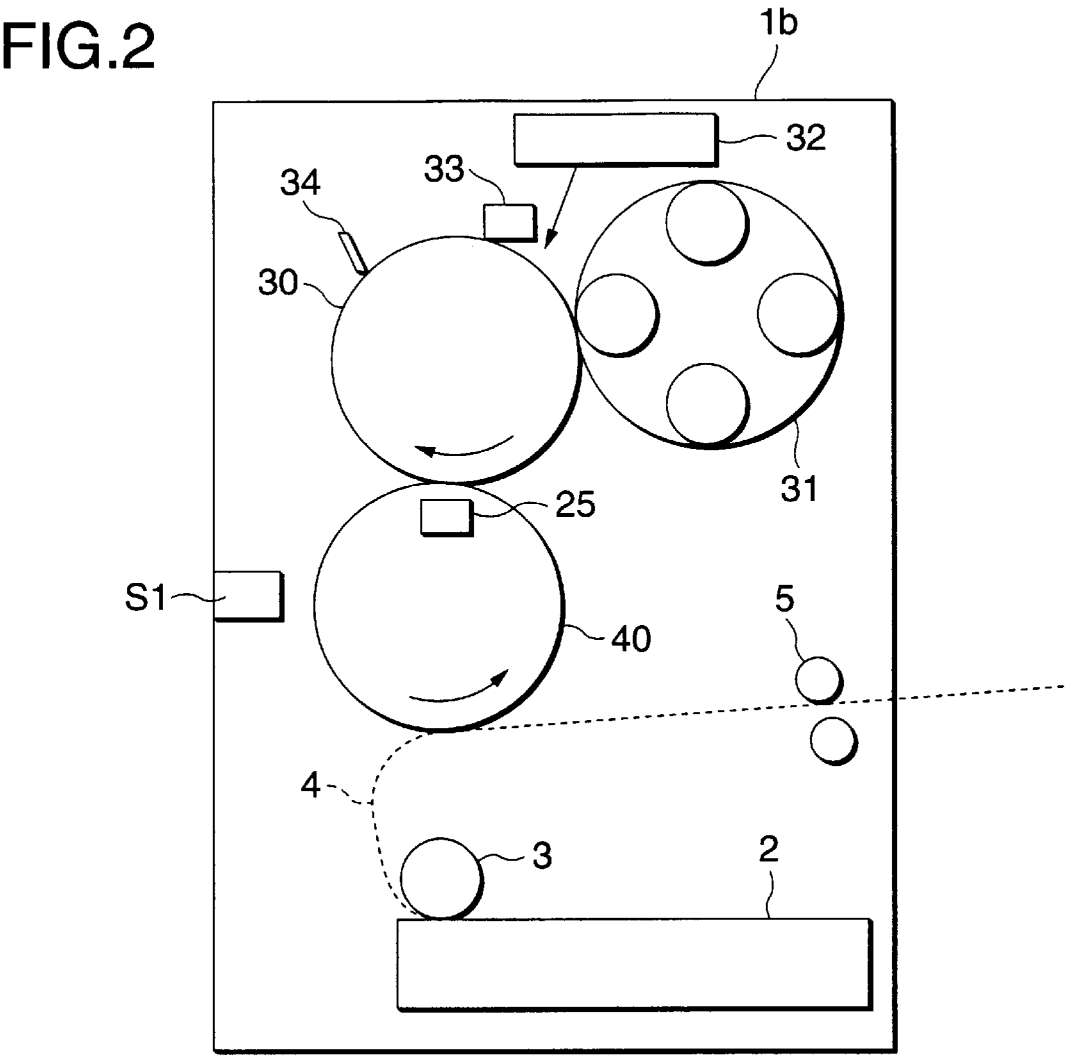
FIG. 2 is an explanatory drawing showing another embodiment of the multicolor image formation apparatus according to the present invention.

FIG. 2 is an explanatory drawing showing another embodiment of the multicolor image formation apparatus according to the present invention, in a multicolor image formation apparatus 1*b*, a photoreceptor drum 30 the full deflection of which is 80 μm is provided to transfer an image on a transfer drum 40, and a developing system 31, a writing device 32, an electrifying collotron 33, a cleaning device 34 and others are arranged opposite to the photoreceptor drum 30. In the developing system 31 arranged opposite to the photoreceptor drum 30, developing machines of four colors, black (K), yellow (Y), magenta (M) and cyan (C) are arranged as in the first embodiment, one of the developing machines is moved to a position corresponding to the photoreceptor drum 30, toner is supplied to an electrostatic latent image formed on the photoreceptor drum 30 and a color toner image is generated.

In the image formation apparatus 1*b*, means for carrying paper from a paper feed tray 2 arranged in a lower part of the body via a paper carrying route 4 using a paper feed roller 3 is provided. The paper is electrostatically wound on the transfer drum 40 and a color toner image formed on the photoreceptor drum 30 is transferred on the paper on the transfer drum 40 by the discharge of a transfer collotron 25. In a state in which plural color toner images are transferred on the paper on the transfer drum 40 with the images overlapped, the paper is fixed via a fixing device 5 and the paper completed as a print is ejected. The similar process system to a general image formation apparatus using electrophotography is arranged opposite to the photoreceptor drum 30, after uniform electrification is applied by the electrifying collotron 33, an electrostatic latent image is formed by radiating a laser beam from the writing device 32, toner is supplied to the above electrostatic latent image from any developing machine in the developing system 31 and a color toner image is formed.

In the image formation apparatus 1*b* equivalent to this embodiment, a photoreceptor drum with the diameter of 200 mm is used for the photoreceptor drum 30, a transfer drum with the diameter of 210 mm is used for the transfer drum 40, and the photoreceptor drum 30 and the transfer drum 40 are respectively rotated at the same peripheral speed.

In the image formation apparatus equivalent to this embodiment, as a reference mark 11 formed on the photoreceptor drum 30 as shown in FIG. 3 as in the first embodiment, reference information for transferring images on the transfer drum 40 is set by forming the reference mark by black toner in case a first color toner image is black for example and transferring the reference mark on paper on the transfer drum 40. Therefore, a position in which a second color toner image is to be formed on the photoconductor can be controlled using the reference mark transferred on the paper on the transfer drum 40 with a sensor S1.

In this embodiment, the above reference mark 11 is used, however, the reference mark may be also produced by notching a part of the transfer drum 40 and applying a mark for reflection on the transfer drum 40.

If means for controlling writing a second color image is provided by transferring the reference mark 11 on the paper on the transfer drum 40, images of a second color and the following colors are further formed on the photoconductor using the reference mark on the transfer drum 40 and a signal for writing an image on the photoconductor is output according to a reference signal as the reference mark provided on the transfer drum 40. Therefore, when color toner images formed on the photoconductor are transferred on the transfer drum 40 with the images overlapped, the position of the images can be prevented from being off.

Figure 6:
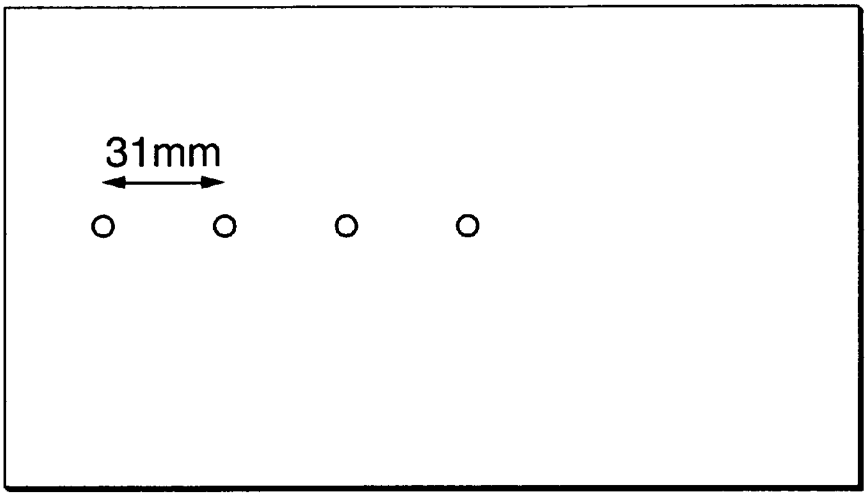
FIG. 6 is a schematic drawing showing a color print sample acquired in a second embodiment.

FIG. 6 is a schematic drawing the contents of which are omitted and which shows only a defect of approximately 100 μm of a color print sample acquired in the second embodiment and even if a defect of approximately 100 μm exists on the photoconductor, it is substantially difficult to find the defect unless a magnifying glass is used though the defect of approximately 100 μm is formed in line at the interval of approximately 31 mm in the order of black, yellow, magenta and cyan in the print produced in the second embodiment. Dispersion such as irregular color is not also seen at all.

(Second example for comparison)

A color print is produced as in the first embodiment except that a transfer drum with the diameter of 200 mm is used for the transfer drum 40.

Figure 7:
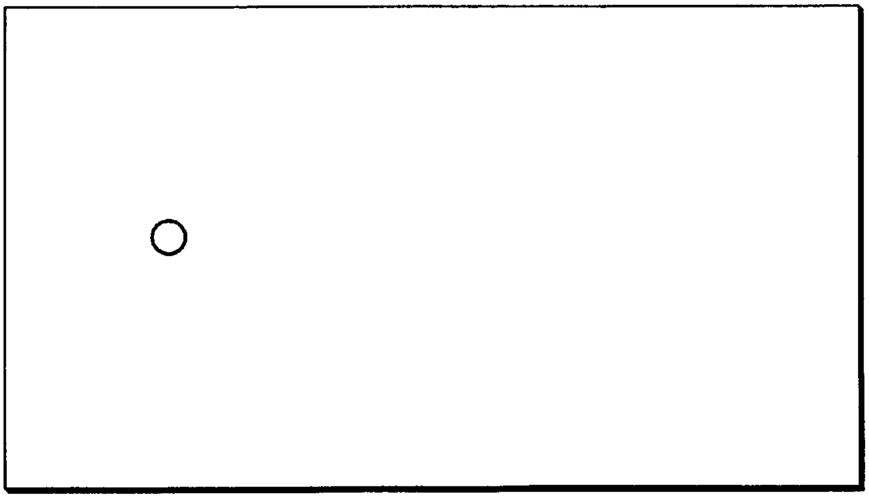
FIG. 7 is a schematic drawing showing a color print sample acquired in a second example for comparison.

FIG. 7 is a schematic drawing the contents of which are omitted and which shows only a defect of approximately 100 μm of a color print sample acquired in a second example for comparison and if a defect of approximately 100 μm exists on a photoconductor, the defect of approximately 100 μm is overlapped at black, yellow, magenta and cyan four points because of the misregistration of a few tens pm when each color is overlapped and the defect appears as a defect of approximately 200 to 300 μm which can be found when the print is stared. Dispersion such as irregular color is not also seen at all.

Third Embodiment

Before the exposure of a second color and the following colors, a gear engaging aphotoreceptor drum 30 and an intermediate transfer member 20 to rotate them at the same speed with them synchronous is released differently from the first embodiment, only the photoreceptor drum 30 is rotated by 4 mm or more in the process direction with the intermediate transfer member 20 stopped to vary a writing start position and writing is started. As a result, as a defect of approximately 100 μm on the photoconductor appears at four points at the interval of 4 mm and hereby, four black, yellow, magenta and cyan points exist in 12 mm, the defect is at a level at which the defect can be detected if the defect is stared consciously.

As the reference mark according to the present invention provided to the intermediate transfer member can be used not only for a mark for setting timing for writing an image on the photoconductor but for a mark for adjusting the density of an image, two types of control information can be acquired using only one sensor. In the above embodiments of the present invention, a case that the image formation apparatus is composed as a laser beam printer is described, however, the above image formation apparatus may be also composed as a color electrophotographic copying machine and can be applied to a apparatus for generating an arbitrary full color pint.

According to the present invention, not only a full color print free of the misregistration of colors can be generated but a color print without a visual problem can be generated without complicated control even if an inevitable minute defect of approximately 100 μm exists on the photoconductor. Dispersion such as irregular color can be also reduced so that the dispersion is not seen at all.

What is claimed is:

1. A multicolor image formation apparatus for generating a color print, comprising:

a photoconductor on which color toner images are formed, an intermediate transfer member on which the color toner images are transferred from said photoconductor, a sensor that detects a reference mark on the intermediate transfer member, and means for differentiating an image writing start position of each color in a process direction of said photoconductor when an image in each color is written on said photoconductor on the basis of a position of the reference mark on the intermediate transfer member detected by the sensor.

2. The multicolor image formation apparatus according to claim 1, wherein:

a writing start position of an image in the each color onto said photoconductor is apart by 5 mm or more in the process direction of said photoconductor.

3. The multicolor image formation apparatus according to claim 1, wherein:

the writing start position of an image in each color is a different position which satisfies the following expression in the process direction of said photoconductor:

$$d=L1/n$$

wherein d is a difference between writing start positions of images in each color, L1 is a peripheral length of the photoconductor, and n is a number of developing machines different in color.

4. The multicolor image formation apparatus according to claim 1, wherein:

a full deflection of said photoconductor is 100 $\mu$m or less.

5. The multicolor image formation apparatus according to claim 1, wherein:

said photoconductor and said intermediate transfer member are constituted so that relationship between a peripheral length L1 of said photoconductor and a peripheral length L2 of said intermediate transfer member satisfies the following expression:

$$L2 \neq N \cdot L1,$$

wherein N is an integer.

6. The multicolor image formation apparatus according to claim 1, wherein:

said photoconductor and said intermediate transfer member are constituted so that relationship between a peripheral length L1 of said photoconductor and a peripheral length L2 of said intermediate transfer member satisfies the following expression:

$$L2=N \cdot L1+(2M+1)/n \cdot L1$$

wherein

N and M are integers, and n is a number of developing machines different in color.

7. The multicolor image formation apparatus according to claim 1, wherein:

a misregistration of colors is prevented by forming an image on said photoconductor according to a reference signal for any place of said intermediate transfer member.

8. The multicolor image formation apparatus according to claim 1, wherein the reference marked is formed on the photoconductor and transferred to the intermediate transfer member.

9. The multicolor image formation apparatus according to claim 1, wherein the reference mark includes a notch formed in the intermediate transfer member.

10. The multicolor image formation apparatus according to claim 1, wherein the reference mark includes a reflective mark on the intermediate transfer member.

11. A multicolor image formation method for generating a color print comprising the steps of:

forming one color toner image on a photoconductor, transferring the one color toner image to an intermediate transfer member, detecting a position of a reference mark on the intermediate transfer member repeating a transfer operation for every color, wherein a writing start position of an image in each color onto said photoconductor is different in a process direction of said photoconductor based on the position of the reference mark on the intermediate transfer member.

12. The multicolor image formation apparatus according to claim 11, wherein the reference mark is formed on the photoconductor and transferred to the intermediate transfer member.

13. The multicolor image formation apparatus according to claim 11, wherein the reference mark includes a notch formed in the intermediate transfer member.

14. The multicolor image formation apparatus according to claim 11, wherein the reference mark includes a reflective mark on the intermediate transfer member.

* * * * *